United States Patent
Lightstone et al.

(10) Patent No.: US 6,714,720 B1
(45) Date of Patent: Mar. 30, 2004

(54) METHOD AND APPARATUS FOR STORING MULTI-MEDIA DATA

(75) Inventors: Michael Lightstone, Fremont, CA (US); Stefan Eckart, Mountain View, CA (US); Richard Webb, Cupertino, CA (US); Haitao Guo, San Jose, CA (US); Xiaohua Yang, San Jose, CA (US); Fabio Ingrao, San Francisco, CA (US)

(73) Assignee: ATI International Srl, Christchurch (BB)

( * ) Notice: Subject to any disclaimer, the term of this patent is extended or adjusted under 35 U.S.C. 154(b) by 0 days.

(21) Appl. No.: 09/518,889

(22) Filed: Mar. 6, 2000

(51) Int. Cl.$^7$ ................................................. H04N 5/91
(52) U.S. Cl. ............................ 386/46; 386/95; 386/125
(58) Field of Search .................... 386/45, 46, 125–126, 386/52, 55, 95; 707/200–205; 711/110, 103; 714/21; 710/310

(56) References Cited

U.S. PATENT DOCUMENTS

| | | | | |
|---|---|---|---|---|
| 5,544,356 A | * | 8/1996 | Robinson et al. | 707/205 |
| 5,668,948 A | * | 9/1997 | Belknap et al. | 710/316 |
| 5,974,503 A | * | 10/1999 | Venkatesh et al. | 711/114 |
| 6,226,038 B1 | * | 5/2001 | Frink et al. | 386/52 |
| 6,240,527 B1 | * | 5/2001 | Schneider et al. | 714/21 |
| 6,535,949 B1 | * | 3/2003 | Parker | 711/103 |

* cited by examiner

Primary Examiner—Thai Tran
Assistant Examiner—Christopher Onuaku
(74) Attorney, Agent, or Firm—Vedder, Price, Kaufman & Kammholz, P.C.

(57) ABSTRACT

A method and apparatus for storing multimedia data for use in a digital VCR includes processing that begins by maintaining a first link list of a plurality of memory sections, where the first link list links the plurality of memory sections as a circular buffer. The processing then continues by receiving a stream of multimedia data. The processing then continues by storing the stream of multimedia data in at least some of the memory sections of the plurality of memory sections. The processing then continues by receiving a request for independent storage of a selected portion of the stream of multimedia data, e.g., the user desires to have a permanent copy of a particular program. The processing further continues by generating a second link list for a set of memory sections of the at least some of the memory sections. The set of memory sections stores the selected portion of the stream of multimedia data. The processing continues by updating the linking of the plurality of memory sections within the first link list without the set of memory section.

13 Claims, 9 Drawing Sheets file system 15

METHOD AND APPARATUS FOR STORING MULTI-MEDIA DATA

TECHNICAL FIELD OF THE INVENTION

This invention relates generally to computers and more particularly to processing multi-media data as a digital VCR.

BACKGROUND OF THE INVENTION

With the advent of digital video technology, many new and exciting products are available. One such product is a digital videocassette recorders (VCR), personal video recorder (PVR), or digital video recorder (DVR), which receives an analog television broadcast, converts it into an MPEG ("Motion Picture Expert Group") digital format and stores the MPEG video. By storing the television broadcast signals in a digital format, the user may view the recorded digital images in a variety of ways, including fast forward, rewind, pause, etc.

The digital VCR allows a user to store various programs and to amass a substantial amount of video data. Such video data may span several hours of program viewing. When the user desires to watch a particular program or particular section of a program, the user inputs the particular start time that corresponds with the beginning of a program or the desired section. For example, if the user has stored programs that are broadcast via a network channel that begin at 7:00 p.m. and end at 10:00 p.m. and desires to watch the program that began at 8:30 p.m., the user would enter 8:30 p.m. as the start time.

Currently available digital VCRs, while providing many of the advantages, have some limitations. For instance, when the digital VCR receives a television broadcast, it can only store it as digital information and then allow it to be played back. If the user is watching a program in real-time (i.e., at the time of broadcast), there is a delay due to the digital processing and storage, which adds delay when the user changes channels. Another limitation is that, if a program is to be stored, the user must have initiated the storage option prior to the program starting. If not, only the portion that is received after the storage option was initiated will be stored. For example, if the user initiates the storage option fifteen minutes into a program, the fifteen minutes will be lost. Another limitation is that current digital VCRs do not allow for storage of still images of video, nor do they allow for multiple simultaneous reads of the stored digital video data.

Therefore, a need exists for a method and apparatus for a digital VCR that allows for the playing of live video, allows for archiving a program regardless of when the storage option is initiated, reduces delays when changing channels, and allows for multiple simultaneous reads of the stored digital video.

DETAILED DESCRIPTION OF A PREFERRED EMBODIMENT

Generally, the present invention provides a method and apparatus for storing multimedia data for use in a digital VCR. Such a method and apparatus includes processing that begins by maintaining a first link list of a plurality of memory sections, where the first link list links the plurality of memory sections as a circular buffer. The processing then continues by receiving a stream of multimedia data. The processing then continues by storing the stream of multi-media data in at least some of the memory sections of the plurality of memory sections. The processing then continues by receiving a request for independent storage of a selected portion of the stream of multimedia data, e.g., the user desires to have a permanent copy of a particular program. The processing further continues by generating a second link list for a set of memory sections of the at least some of the memory sections. The set of memory sections stores the selected portion of the stream of multimedia data. The processing continues by updating the linking of the plurality of memory sections within the first link list without the set of memory section. With such a method and apparatus, a user may select independent storage of selected programs or portions thereof utilizing the same memory structure that is used for storing the digital video. As such, the memory structure within the digital video cassette recorder of the present invention is reduced and more efficiently utilized in comparison with prior art digital VCRs.

Figure 1:
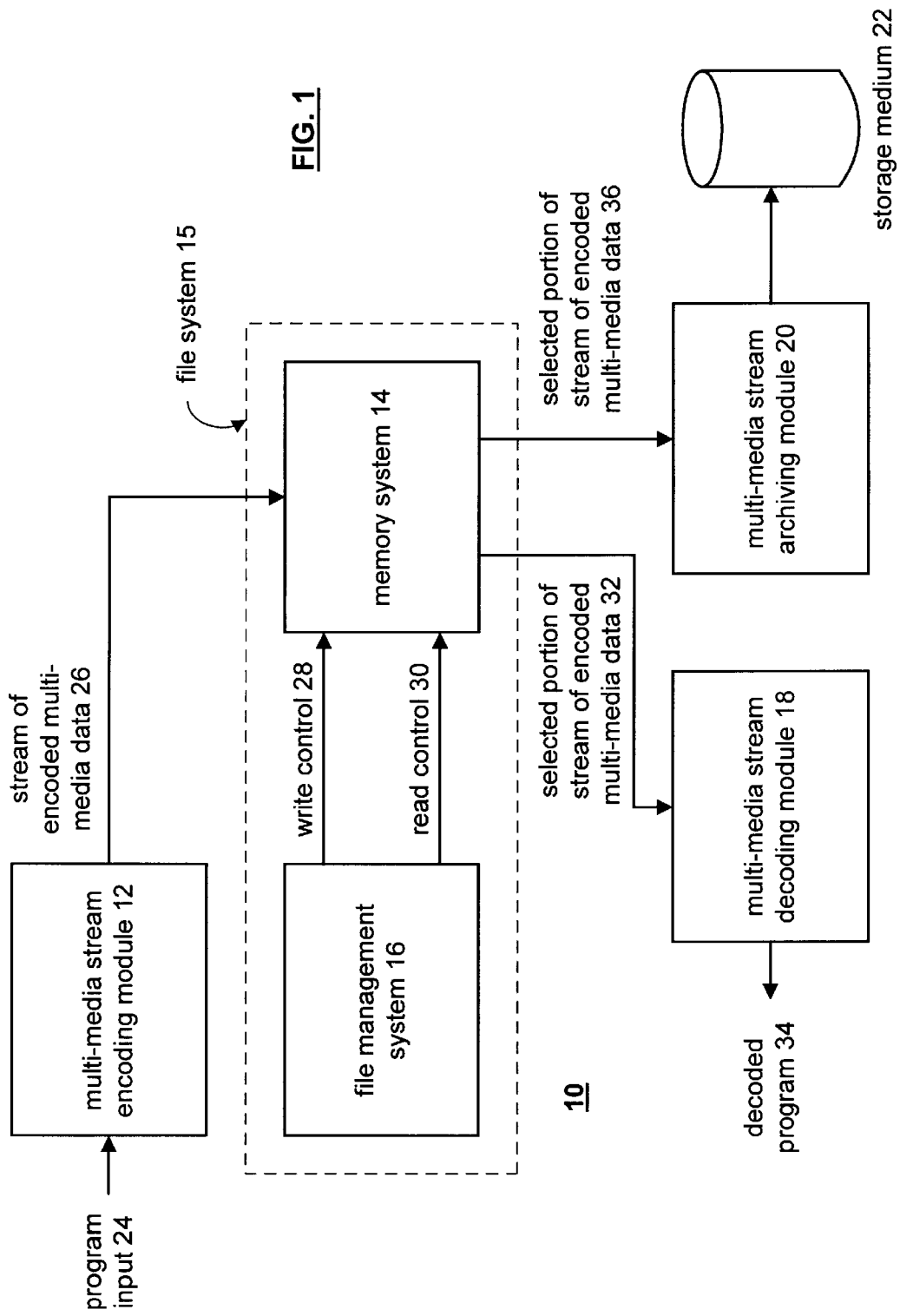
FIG. 1 illustrates a schematic block diagram of a digital video recorder in accordance with the present invention.

The present invention can be more fully described with reference to FIGS. 1 through 9. FIG. 1 illustrates a schematic block diagram of a digital VCR 10 that includes a multi-media stream encoding module 12, a file system 15, a multimedia stream decoding module 18, a multimedia archiving module 20 and a storage medium 22. The file system 15 includes a file management system 16 and a memory system 14. The multimedia stream encoding module 12 is operably coupled to receive a program input 24. The program input may be originated from a television broadcast, cable broadcast, satellite broadcast, VCR output, DVD output, or any audio/video analog signal. The multi-media stream encoding module 12, which will be discussed in greater detail with reference to FIG. 2, encodes the program input 24 into a stream of encoded multimedia data 26. For example, the multimedia stream encoding module 12 may convert the analog signals of the program input 24 into MPEG data.

The stream of encoded multimedia data 26 is stored in the memory system 14 as directed by the file management 16. The file management 16 provides write control information 28 to the memory system 24 such that the stream of encoded multimedia data 26 is properly stored. Generally, the write control information 28 will indicate the particular sections of memory that the stream of data 26 is to be written into and coordinates time-stamping the information. For example, the memory system 14 may include a plurality of memory sections, each memory section being capable of storing one megabyte of information, which corresponds to approximately one to two seconds of MPEG video data. As such, each memory section may include a corresponding time stamp or the time-stamps may be independent of the memory section sizes and based on a selected time interval associated with the video.

When data is to be retrieved from memory system, the file management system 16, in accordance with a user input, provides read control signals 30 to the memory section 14. Note that the file management system 16 may provide multiple read control signals 30 to the memory system thus allowing multiple simultaneous reads of the stored data 26.

If a portion of the stored data is to be displayed on a television set, a selected portion of the stream of encoded multimedia data 32 is retrieved from memory system 14 and provided to a multimedia stream decoding module 18. The multimedia stream decoding module 18, which will be described in greater detail with reference to FIG. 3, produces a decoded program 34 from the retrieved data. The decoded program 34 may include a video component and audio component, and may optionally further include close caption component.

Alternatively, or simultaneously with the displaying of stored video data, the file management system 16 may provide a read control 30 that causes a selected portion of the stream of encoded multimedia data 36 to be provided to a multimedia archiving module 20. The archiving module 20 receives the data 36 and causes it to be stored in a storage medium 22. The storage medium 22 may be a hard drive of a personal computer, RAM of a personal computer, floppy disk, or any particular digital storage medium. Further, the storage medium 22 may include the memory system 14, where the archived copy of the program is stored in the memory system 14. Such a storage technique will be described below with reference to FIGS. 4 and 9.

The elements of FIG. 1 may be implemented as separate processing modules having associated memories or as a single processing module having an associated memory. Such a processing module may be a single processing device or a plurality of processing devices. A processing device may be a microprocessor, a microcontroller, digital signal processor, state machine, logic circuitry, and/or any device that manipulates signals (analog or digital) based on operational instructions. The associated memory(ies) stores the operational instructions executed by the corresponding processing module(s). Such a memory may be a single memory device or a plurality of memory devices. Such a memory device may be a random access memory, read-only memory, floppy disk memory, magnetic tape memory, hard drive memory, and/or any device that stores digital information.

The digital VCR of FIG. 1 may further include an external multimedia stream archiving module that is operably coupled to receive a different selected portion of the stream of encoded multimedia data in accordance with a separate one of the multiple read operations. The multimedia stream archiving module would then save the selected portion on a designated external digital storage medium such as a zip drive, a read/write CD, external RAM, DVD, etc. Alternatively, the external multimedia stream archiving module may save the program on a designated external analog storage medium. To do this, the retrieved data would first need to be decoded into an analog form. Such an analog storage media may be a videocassette. Note that the selected portion of the stream of encoded multimedia data 36 processed by the archiving module 20 may be a still frame or a plurality of frames making up an animated video image.

Figure 2:
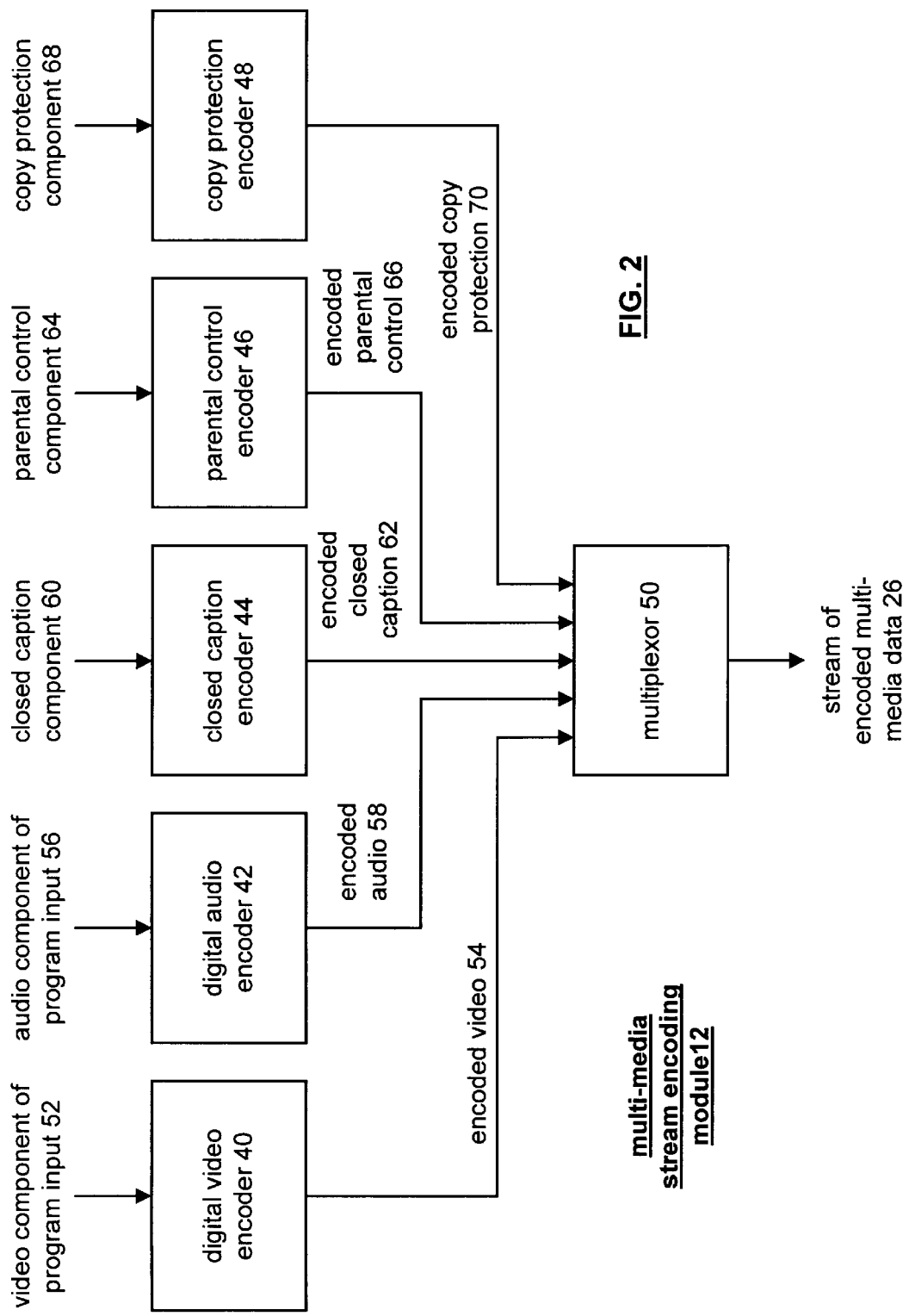
FIG. 2 illustrates a schematic block diagram of a multi-media stream encoding module of FIG. 1.

FIG. 2 illustrates a schematic block diagram of the multimedia stream encoding module 12. The encoding module 12 includes a digital video encoder 40, a digital audio encoder 42, and may further optionally include one or more of a close-captioned encoder 44, a parental control encoder 46 and a copy protection encoder 48. The video encoder 40 is operable coupled to receive a video component 52 of the program input and to produce therefrom encoded video data 54. The video encoder 40 may utilize an MPEG encoding process such that the encoded video data 54 is a digital MPEG stream.

The digital audio encoder 42 receives an audio component 56 of the program input and produces therefrom encoded audio data 58. The digital audio encoder 42 may perform an MPEG audio encoding function such that the encoded audio data 58 is encoded in accordance with the MPEG standard.

If the encoding module 12 further includes a closed captioned encoder 44, the closed-captioned encoder 44 receives the closed-captioned component 60 of the program input and produces therefrom encoded closed-captioned data 62. Such may be done in accordance with the vertical blanking interval 21 of broadcast television and including in the video digital stream.

If the encoding module 12 further includes a parental control encoder 46, the parental control encoder 46 receives a parental control component 64 and produces an encoded parental control 66. The parental control may include V chip programming information, motion picture rating information, and may further process a parent's selecting of the program. As such, the encoded parental control data 66 includes the appropriate settings that are stored with the encoded video and audio such that appropriate parental control is exercised with each replay of the stored video and audio data.

If the encoding module 12 further includes a copy protection encoder 48, the copy protection encoder 48 is operably coupled to receive a copy protection component 68 of the program input and to produce an encoded copy protection data 70. The copy protection may be included by the content provider of the video information that may restrict copying, prevent copying, and/or provide alternate copying options. If the copy protection indicates prevention of copying, the encoded copy protection data 70 will prevent the stream of encoded multimedia data 26 from being stored.

The encoding module 12 further includes multiplexor 50 which is operably coupled to receive the encoded video data 54, the encoded audio data 58, and is further optionally coupled to receive the encoded close captioned data 62, the parental control data 66 and the encoded copy protection data 70. Multiplexor 50 combines the signals into a stream of encoded multimedia data 26. Note that the encoding module 12 may further include a digital input port that is directly coupled to the multiplexor 50 for receiving digital input signals.

Figure 3:
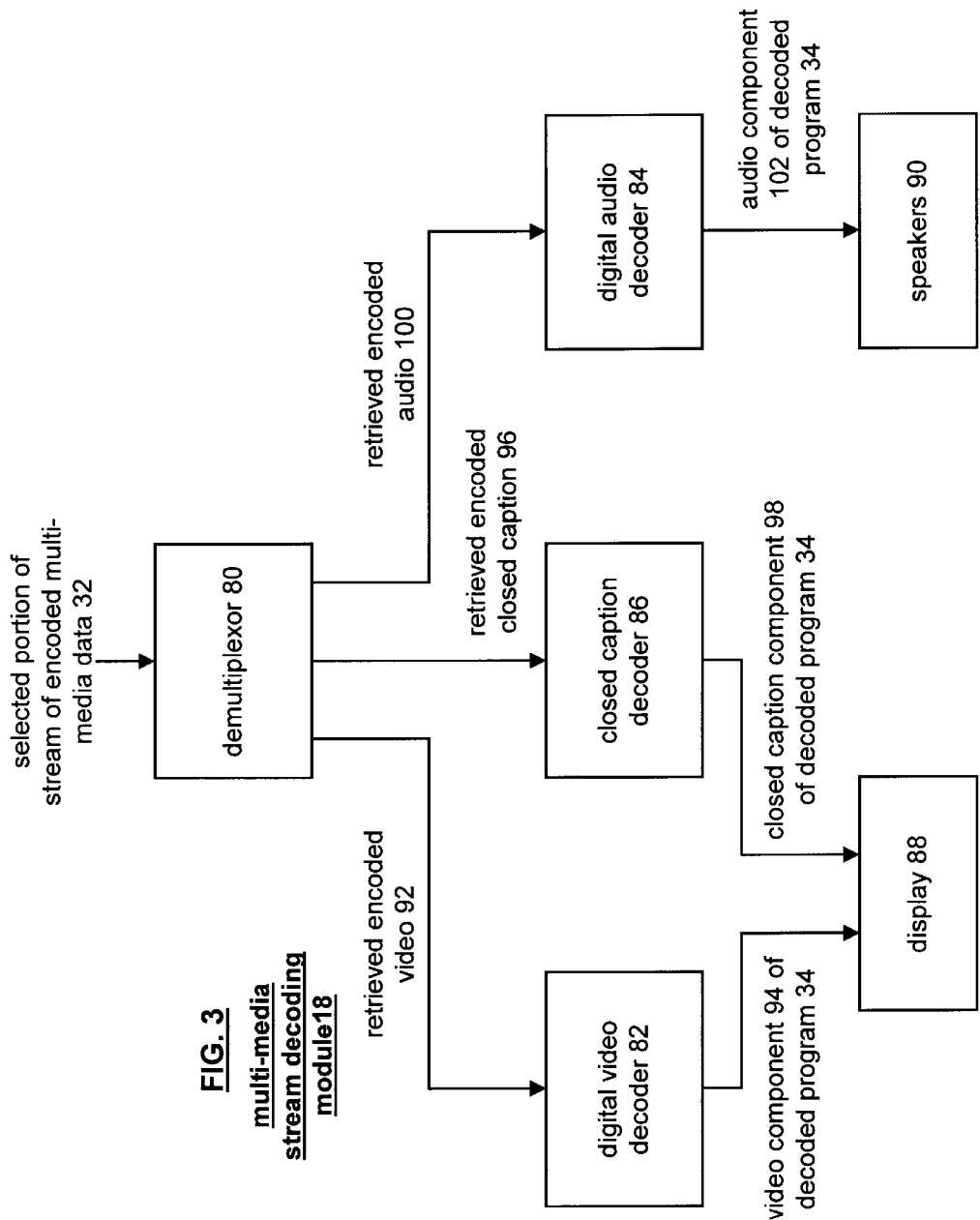
FIG. 3 illustrates a schematic block diagram of a multi-media stream decoding module of FIG. 1.

FIG. 3 illustrates a schematic block diagram of the multimedia stream decoding module 18. The decoding module 18 includes a de-multiplexor 80, a digital video decoder 82, a closed-captioned decoder 86, and a digital audio decoder 84. The de-multiplexor 80 is operably coupled to receive a selected portion of the stream of encoded multimedia data 32 from the file system 15. The de-multiplexor 80 separates the stream of data 32 into encoded video 92, encoded closed-caption 96 and encoded audio 100.

The digital video decoder 82 is operably coupled to receive the encoded video 92 and produce a video component 94 of the decoded program. The video decoder 82 may utilize an MPEG decoding scheme such that the encoded video 92 is stored in an MPEG format and is decoded into analog video component 94. The video component 94 is provided to a display 88. The display 88 may be a television, a monitor, a CRT, and/or a LCD display.

The closed-captioned decoder 86 receives the encoded closed-captioned data 96 and produces a closed captioned component 98 of the decoded program 34. The encoded closed-captioned data may be a simple text file that is subsequently passed as the closed-captioned component 98 or may be encrypted which would require decryption or any other known type of storage of text information. The closed-captioned component 98 is provided to display 88, which is subsequently viewed.

The digital audio decoder 84 is operably coupled to receive encoded audio 100 which may be encoded in accordance with the MPEG standard. The digital audio decoder 84 decodes the MPEG encoded audio data 100 and produces therefrom an analog audio component 102. The analog audio component is provided to speakers 90. The speakers may include a preamplifier stage, which amplifies the audio component 102 to provide the appropriate volume levels.

Figure 4:
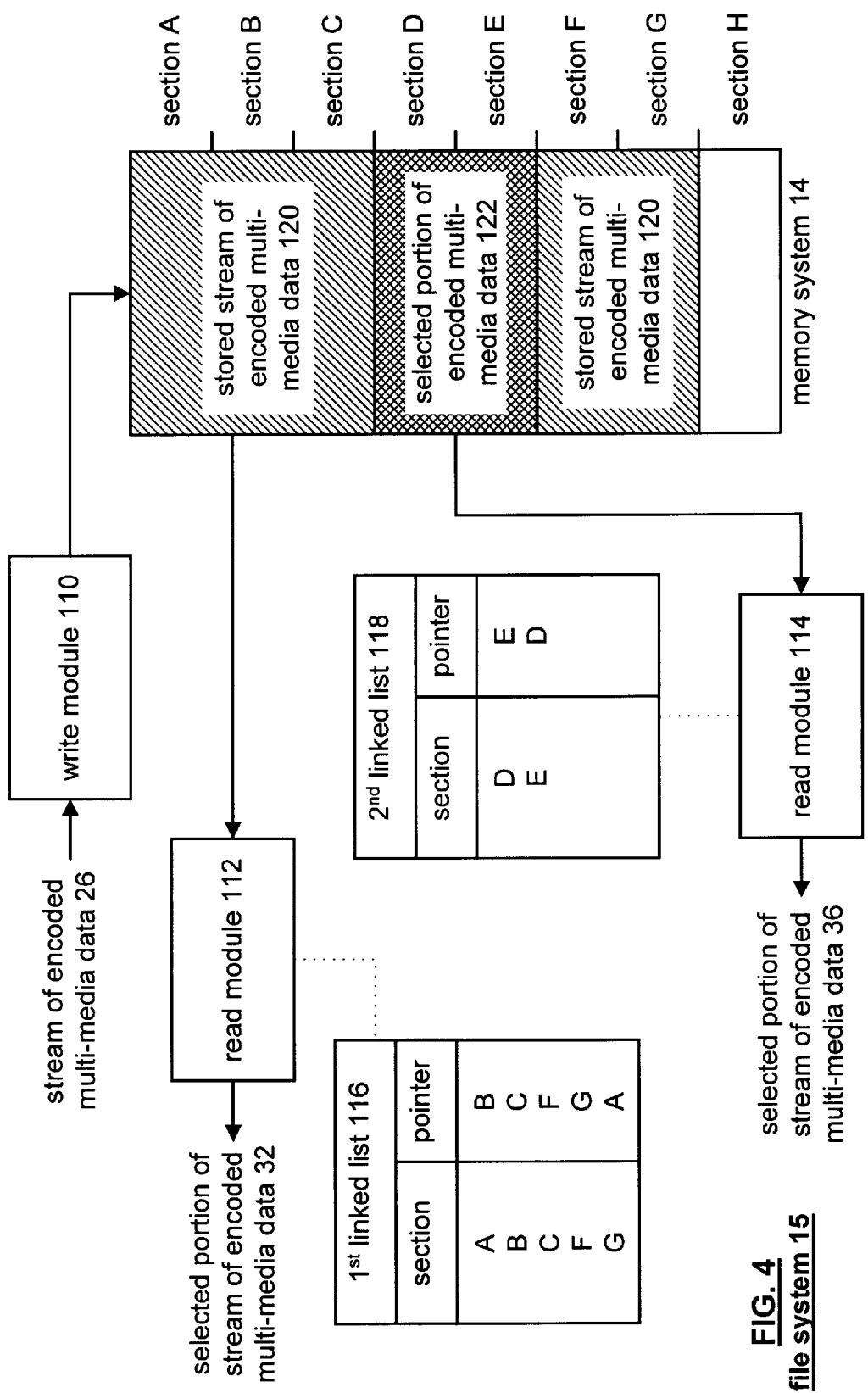
FIGS. 4 illustrates a functional diagram of the file system of FIG. 1.

FIG. 4 illustrates an operational representation of the file system 15. The file system 15 includes the file management 16 and memory system 14. The file management system 16 includes a write module 110 and read modules 112 and 114. The file management system 16 further includes a plurality of link lists 116 and 118. As shown, the memory system is divided into a plurality of sections where each section stores a portion of the encoded multimedia data. As shown, sections A through C and F and G store the stream of encoded multimedia data 120. Sections D & E store a selected portion of the encoded multimedia data 122. In this example, the user has desired that a portion of the encoded data be selected and retrieved for archiving. The write module 110 coordinates the writing of the stream of encoded multimedia data 26 into the memory system 14 and controls the updating of the first link list 116 as data is written into new memory sections. The first link list 116 maintains a link list of the memory sections that are storing the multimedia data 26 in a circular buffer fashion. As such, when the user desires a particular portion of the stream of encoded data to be viewed, the read module 112 utilizes the first link list to output the selected portion of the multimedia data 32. If the user desires to output an archive portion of the multimedia data 36, the read module 112 would access the second link list which would cause the archived portion to be provided to the displays.

The first link list 116 shows that the stored multimedia data 120 is stored in sections A, B, C, F & G. The pointer field of the linked list points to the next section in the link list. As shown, section A has a pointer to Section B, B has a pointer to Section C, C has a pointer to Section F, F has a pointer to Section G and G has a pointer to Section A such that a circular buffer is obtained.

The second link list 118 stores a link list of memory sections that are storing the selected portion of the encoded multimedia data 122 as a permanent copy of the selected portion, e.g., a selected program. In this example only Sections D and E store the selected portion. As such, the second link list includes entries for sections D and E. The read module 114 utilizes the second link list 118 to retrieve the selected portion of the stream of encoded multimedia data 36 from the memory system, which is subsequently provided to the storage medium. Note that the second linked list 118 may be arranged as a circular buffer.

Figure 5:
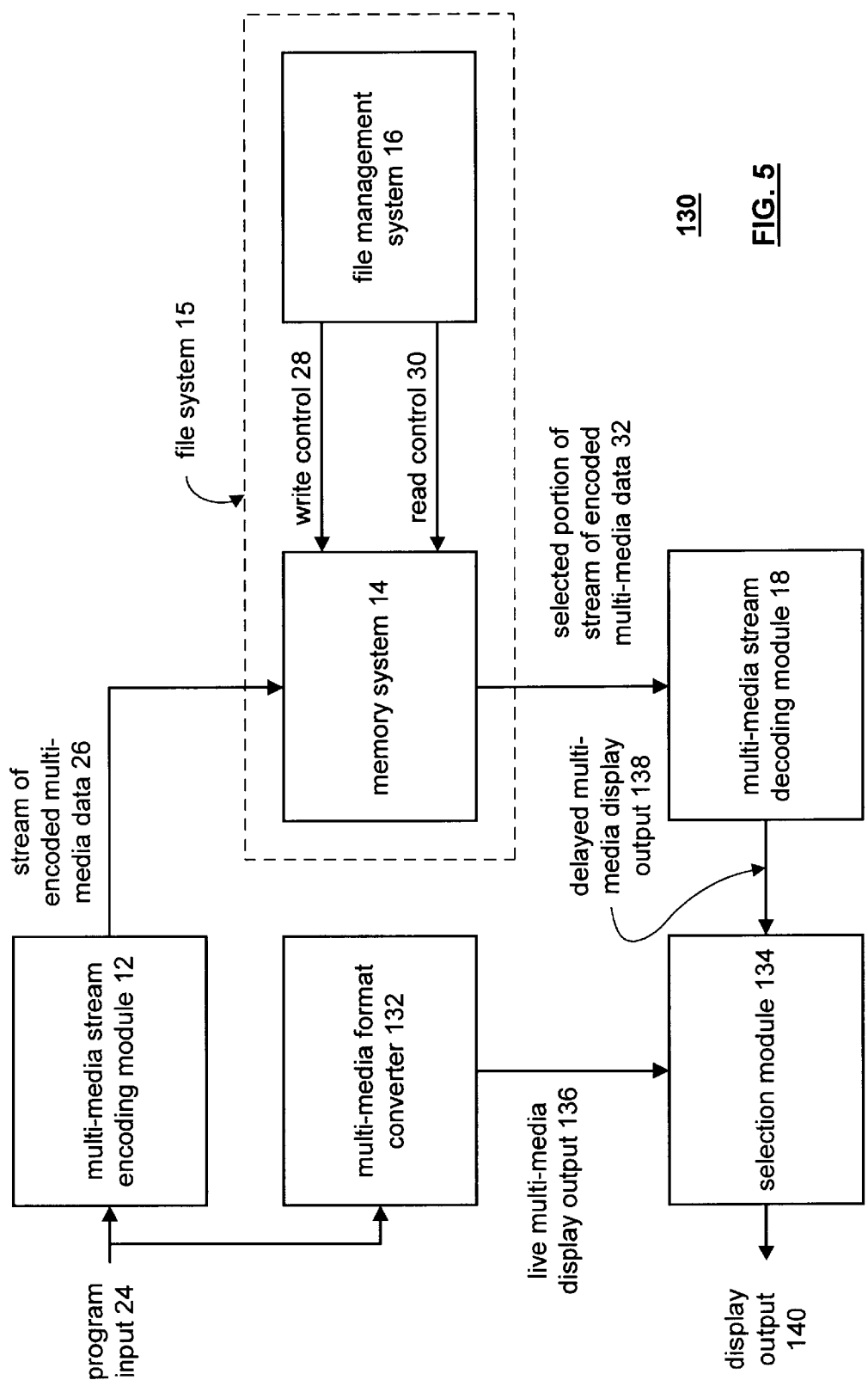
FIG. 5 illustrates a schematic block diagram of an alternate digital VCR in accordance with the present invention.

FIG. 5 illustrates a schematic block diagram of an alternate digital video recorder in accordance with the present invention. The digital video recorder 130 includes the multimedia stream encoding module 12, the file system 15, the multimedia stream decoding module 18, a multimedia format converter 132 and a selection module 134. The multimedia format converter 132 is operably coupled to receive the program input 24 and to produce a live multimedia display output 136. The multimedia format converter may include a video capture module operably coupled to capture the program input to produce a stored program input. The format converter 132 may also include a video decoder operably coupled to digitize the stored program input into a video graphics signal and a digital audio signal. For example, the multimedia format converter 132 may include similar circuitry as the TV decoder and/or encoder portion of the All-In-Wonder Board produced by the ATI Technologies.

The selection module 134 is operably coupled to receive the live multimedia display output 136 and the delayed multimedia display output 138. Note that the displayed delayed multimedia display output 138 is similar to the decoded program 34 produced by digital VCR 10 of FIG. 1. The selection module selects either the live multimedia display data 136 or the delayed multimedia display output 138 in a variety of ways. In one manner, the selection module 134 includes an auto selecting module that enables the outputting of the live multimedia display output when the delayed multimedia display output is near in time to the live multimedia display output. Near in time may be within a few seconds that corresponds to the time it takes to receive the program input 24 and to produce the delayed multimedia display output 138. By utilizing the live output as opposed to the stored digital output, video and audio quality is enhanced since it goes through less conversions. In the alternative, when the delayed multimedia display is not near in time to the live multimedia display output, the selection module outputs the delayed multimedia display output. As a further alternative, the selection module may receive an input that receives a user selection to enable the outputting o the live multimedia display output or the delayed multimedia display output.

Note that the components of the digital VCR 130 that have the same reference number of the components of the digital VCR 10 of FIG. 1 function in the same manner and thus will not be described in detail.

Figure 6:
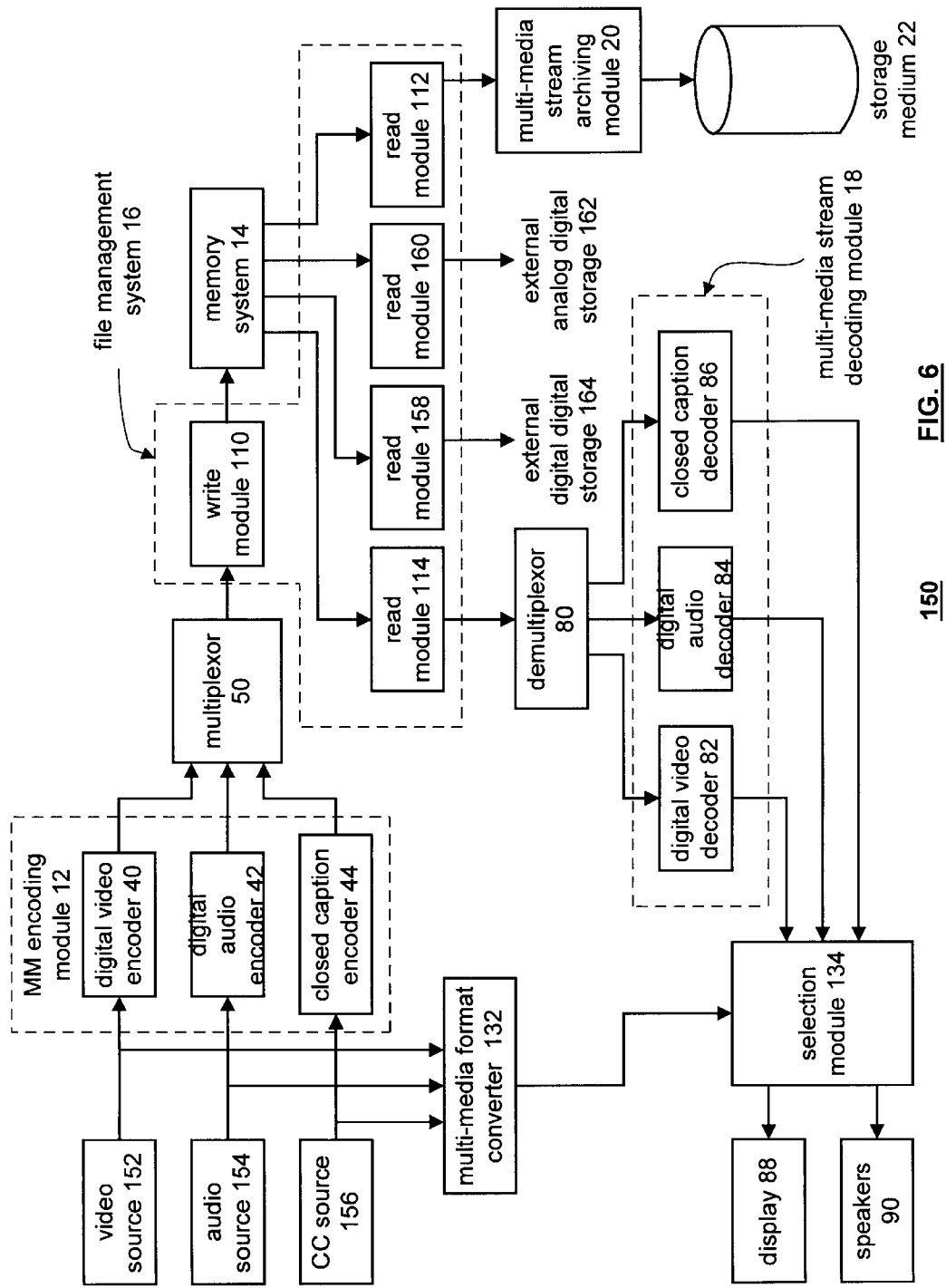
FIG. 6 illustrates a schematic block diagram of another alternate digital VCR in accordance with the present invention.

FIG. 6 illustrates a schematic block diagram of an alternate digital VCR 150. The digital VCR 150 includes many of the elements of digital VCR 10 and digital VCR 130. As such, the elements of the digital VCR 10 or digital VCR 130 that are included in digital VCR 150 will not be discussed in detail. Digital VCR 150 includes, within the file management system 16 read modules 158 and 160. Read module 158 retrieves a portion of the encoded data stored in memory system 14 and provides it to an external digital storage device 164. Such a digital storage device may be a read-write CD, a DVD, etc. Read module 160 retrieves encoded data from memory system 14 and provides it to an external analog digital storage device 162. Such an external analog digital storage device may be a video cassette recorder. In this instance, the read module 160 would process the data through a decoder such that the output is in analog form.

The multimedia encoding module 12 is operably coupled to receive video signals to a video source 152, audio signals from an audio source 154 and close caption signals from a close caption source 156. Sources 152 through 156 may be a single source of a television broadcast, etc.

Figure 7:
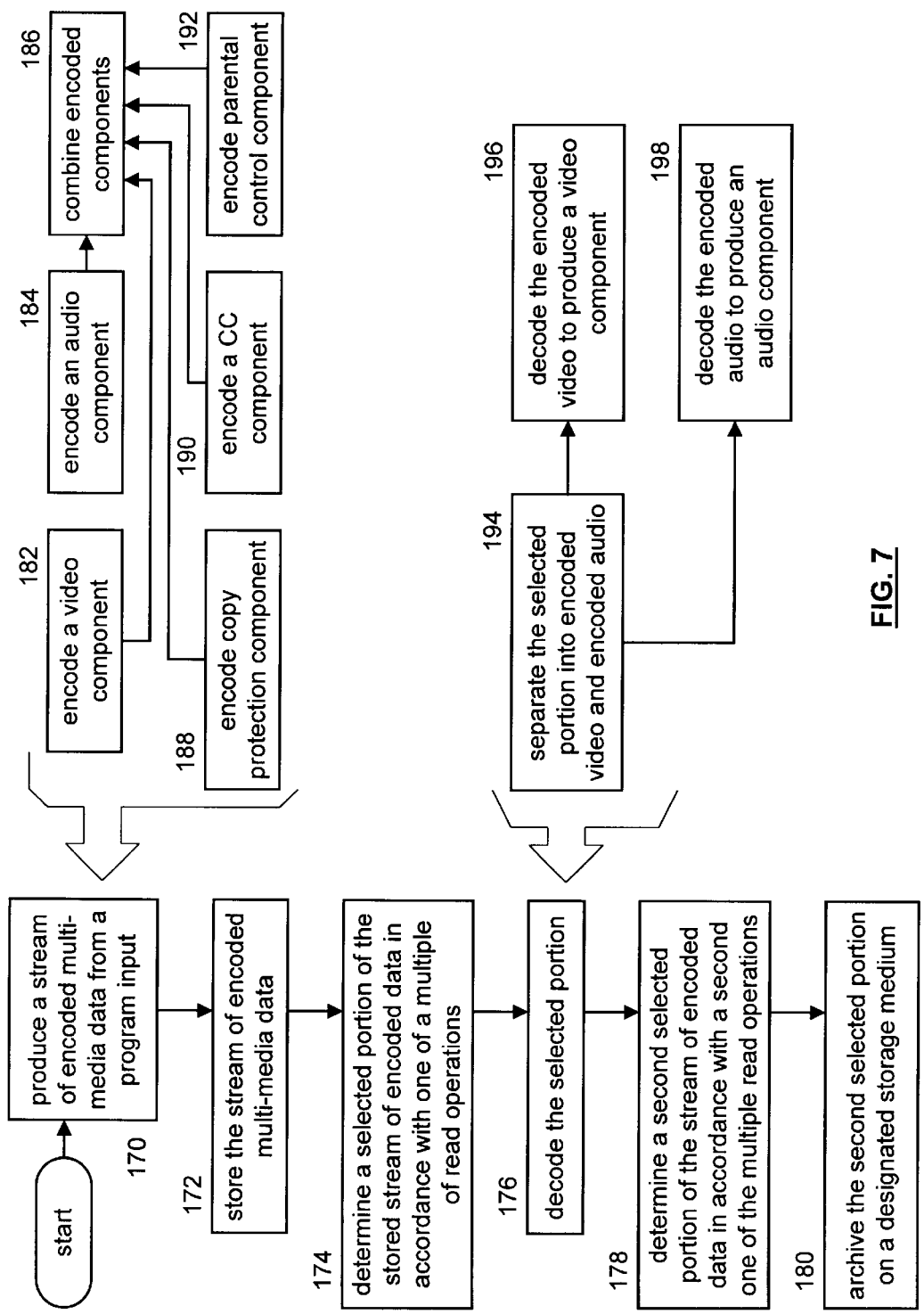
FIG. 7 illustrates a logic diagram of a method for processing multimedia data in accordance with the present invention.

FIG. 7 illustrates a logic diagram of a method for processing multimedia data within a digital VCR. The process begins at step 170 where a stream of encoded multimedia data is produced from a program input. Such processing may be further described with reference to steps 182 through 192. Steps 182, 184, 188, 190 and 192 encode a video component, audio component, copy production component, close caption component, and/or a parental control component of the program input, respectively. The encoding process may be in accordance with the MPEG standard or any method for digitizing audio and/or video information. The encoded components are then combined at step 186 to produce the stream of multimedia data.

Returning to the main flow of FIG. 7, the process proceeds to step 172, where the stream of encoded multimedia data is stored within the memory system. The process then proceeds to step 174 where a selected portion of the stored stream of encoded data is determined in accordance with one of a multiple read operations. The read operations are initiated by the user of the system to view a particular program or portion thereof.

The process then proceeds to step 176 where the selected portion is decoded. The decoding may be done in accordance with steps 194 through 198. At step 194 the selected portion of the stream of encoded multimedia data is separated into encoded video data and encoded audio data. The process then simultaneous proceeds to step 196 and 198. At step 196 the encoded video data is decoded to produce a video component. At step 198 the encoded audio data is decoded to produce an audio component.

Returning to the main flow of FIG. 7, the process proceeds to step 178 where a second selected portion of the stream of encoded data is determined in accordance with a second one of the multiple read operations. In this instance, the user has opted to store, in an independent storage, at least a portion of the program as identified as the second selected portion. Note that the second selected portion may be a still frame or a plurality of images that make up animated video. The process then proceeds to step 180 where the second selected portion is archived on a designated storage medium. The processing of FIG. 7 may further include, but not shown, determining a third selected portion of the stream of encoded multimedia data in accordance with a third one of the multiple read operations and archiving the third selected portion on a designated external digital storage medium. As an alternative, the third selected portion may be decoded to produce a decoded selected program portion and archived on a designated external analog storage medium.

Figure 8:
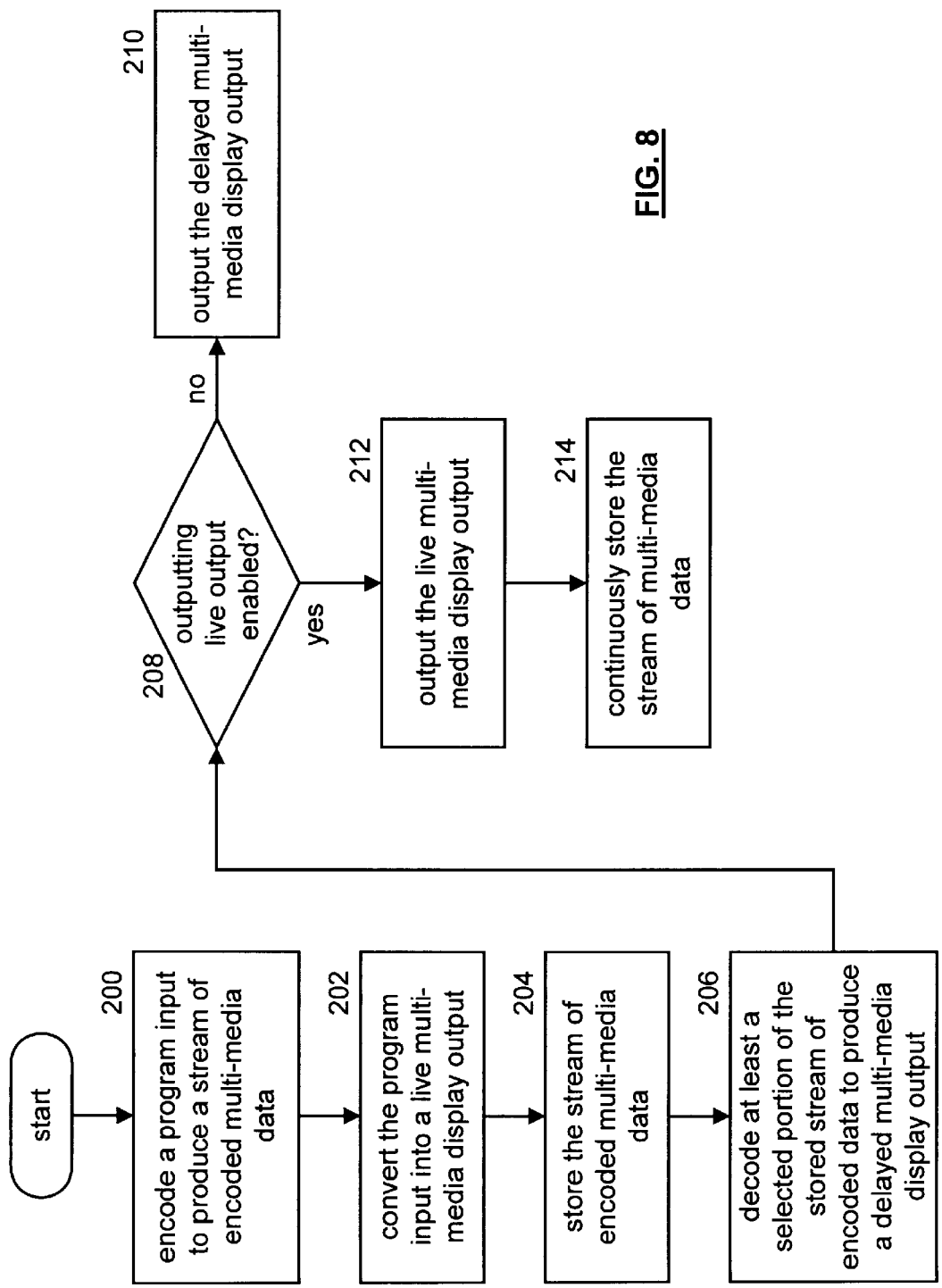
FIG. 8 illustrates a logic diagram of a method for switching between live video and stored digital video in accordance with the present invention.

FIG. 8 illustrates a logic diagram of a method for processing multimedia data as either live or delayed data. The process begins at step 200 where a program input is encoded to produce a stream of encoded multimedia data. The encoded multimedia data may be stored as a stored program input and digitized to produce a video graphics signal and a digital audio signal. The process then proceeds to step 202 where the program input is converted into a live multimedia display output. Such a conversion process may be done in accordance with the circuitry found in the TV encoder of the All-in-Wonder Board produced and manufactured by ATI Technologies. The process then proceeds to step 204 where a stream of multimedia data is stored.

The process then proceeds to step 206 where at least a selected portion of the stored stream of encoded data is decoded to produce a delayed multimedia display output. The process then proceeds to step 208 where a determination is made as to whether the outputting of live data is enabled. The determination may be based on an automated process that outputs the live multimedia display output when the delayed multimedia display output is near in time to the live multimedia display output. Alternatively, if the delayed multimedia display output is not near in time to the live multimedia display output, the process automatically outputs the delay multimedia display output. Note that in time corresponds to essentially the time it takes to receive the program input and produce the delayed multimedia display output. As such, if the user is watching the program in real time, there is no need to display the stored image, which may have a degraded video and/or audio quality. Alternatively, the enablement of the live output may be determined based on a user input.

If the live output is enabled, the process proceeds to step 212 where the live. multimedia display output is outputted. In addition, the process proceeds to step 214 where the multimedia data is continuously stored. By continuously storing the data, the digital VCR of the present invention allows for live images to be displayed and stored which is not available in currently marketed VCRs. If, however, the live output is not enabled the process proceeds to step 210. At step 210 the delayed multimedia display output is outputted.

Figure 9:
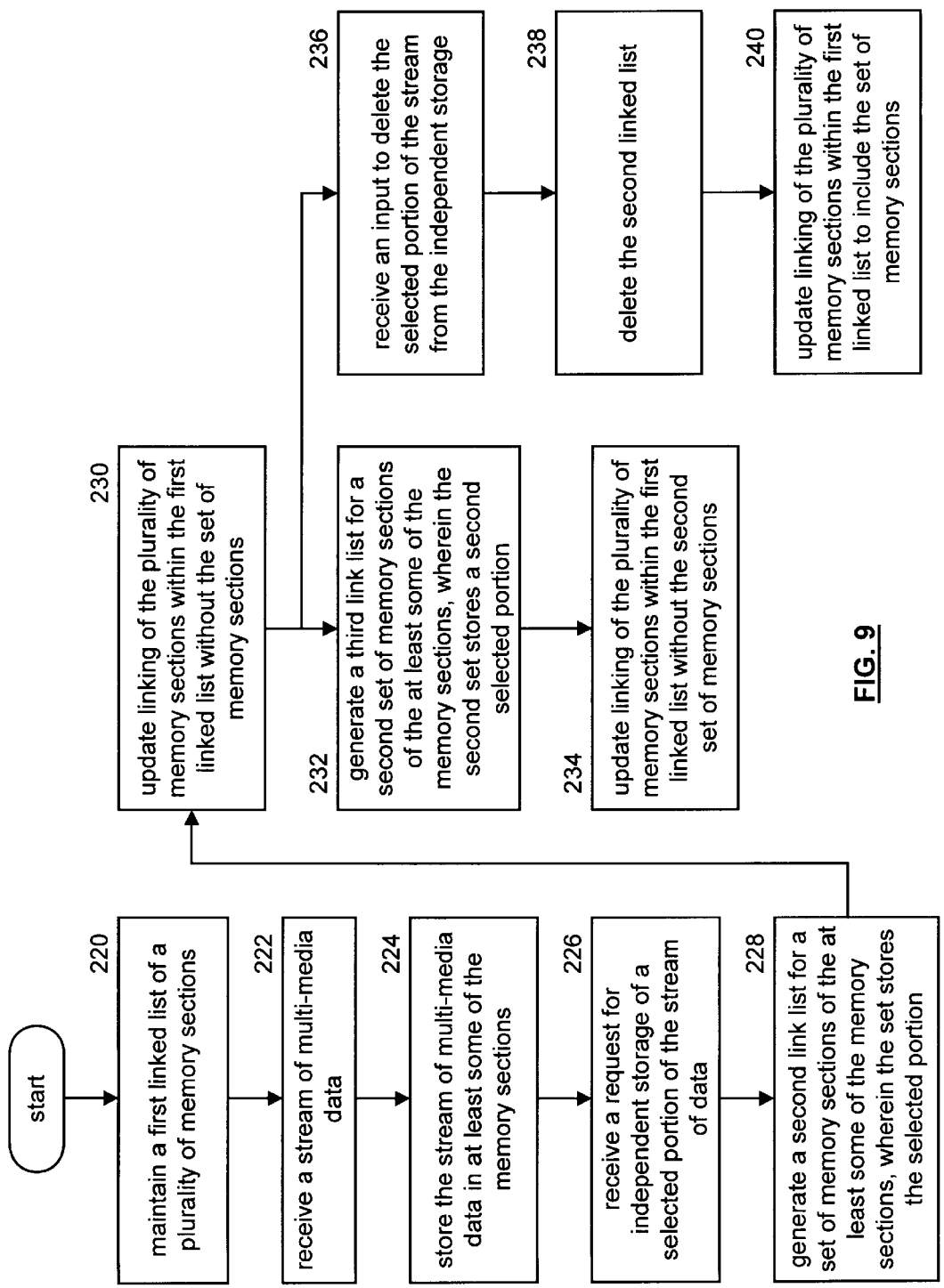
FIG. 9 illustrates a logic diagram of a method for maintaining the file system in accordance with the present invention.

FIG. 9 illustrates a logic diagram for maintaining a file system for use by a digital VCR. The process begins at step 220 where a first link list of a plurality of memory sections is maintained. The first link list includes the identity of memory sections in a circular buffer fashion. The process then proceeds to step 222 where a stream of multimedia data is received. The process then proceeds to step 224 where the stream of multimedia data is stored in at least some of the memory sections. This was illustrated with an example as shown in FIG. 4. The process then proceeds to step 226 where a request for independent storage of a selected portion of the stream of data is received. The process then proceeds to step 228 where a second link list for a set of memory sections that store the selected portion is generated. The process then proceeds to step 230 where the first link list is updated to remove the set of memory sections that store the selected portion.

The process then proceeds simultaneously or in the alternative to steps 232 and 234 or to steps 236 through 240. At step 232 a third link list is generated for a second set of memory sections of the at least some of the memory sections. The second set of memory sections stores a second selected portion of the stream of multimedia data. As such, the user has selected another portion of the stored information to be independently stored for permanent storage. The process then proceeds to step 234 where the first link list is updated to remove the second set of memory sections.

At step 236 an input is received to delete the selected portion of the stream of multimedia data from the independent storage. The process then proceeds to step 238 where the second link list is deleted. The process then proceeds to step 240 where the first link list is updated to include the set of memory sections.

The preceding discussion has presented a method and apparatus for a digital VCR having enhanced features. As such, the user of the digital VCR in accordance with the present invention may view live video files while simultaneously storing it, changing channels more quickly. Store and retrieve still images, utilize less memory, etc. As one of average skill in the art would appreciate other embodiments may be derived from the teachings of the present invention without deviating from the scope of the claims.

What is claimed is:

1. A file system for storing multi-media data, the file system comprises:

a memory structure that includes a plurality of memory sections; and a file management system operably coupled to the memory structure, wherein the file management system maintains a first linked list of the plurality of memory sections, wherein the first linked list links the plurality of memory sections as a circular buffer, wherein at least some of the memory sections of the plurality of memory sections stores a stream of multi-media data, and wherein the management system generates a second linked list for a set of memory sections of the at least some of the memory sections, wherein the set of memory sections stores a selected portion of the stream of multi-media data, and wherein the file management system removes the set of memory sections from the first linked list.

2. The file system of claim 1, wherein the file management system further functions to update linking of the plurality of memory sections within the first linked list without the set of memory sections.

3. The file system of claim 1, wherein the file management system further comprises means for determining the selected portion of the stream of multi-media data based on receipt of an input.

4. The file system of claim 1, wherein the file management system further comprises a third linked list for a second set of memory sections of the at least some of the memory sections, wherein the second set of memory sections stores a second selected portion of the stream of multi-media data, and wherein the file management system removes the second set of memory sections from the first linked list.

5. The file system of claim 1, wherein the file management system further functions to delete the second linked list in response to an input to delete the selected portion of the stream of multi-media data, and wherein the file management system further functions to update linking of the plurality of memory sections within the first linked list to include the set of memory sections.

6. The file system of claim 1, wherein each memory section of the plurality of memory sections further comprises memory for storing a program segment, such that fragmentation of the file structure will have negligible adverse affects on reading and writing of the stream of multi-media data.

7. The file system of claim 1, wherein the memory structure comprises a portion of a storage medium, wherein a number of memory sections of the plurality of memory sections changes based on allocation of memory sections within the storage medium to the file structure.

8. A method for storing multi-media data, the method comprises the steps of:
maintaining a first linked list of a plurality of memory sections, wherein the first linked list links the plurality of memory sections as a circular buffer,
receiving a stream of multi-media data;
storing the stream of multi-media data in at least some of the memory sections of the plurality of memory sections;
receiving a request for independent storage of a selected portion of the stream of multi-media data;
generating a second linked list for a set of memory sections of the at least some of the memory sections, wherein the set of memory sections stores the selected portion of the stream of multi-media data; and
updating linking of the plurality of memory sections within the first linked list without the set of memory sections.

9. The method of claim 8 further comprises:
generating a third linked list for a second set of memory sections of the at least some of the memory sections, wherein the second set of memory sections stores a second selected portion of the stream of multi-media data; and
updating linking of the plurality of memory sections within the first linked list without the second set of memory sections.

10. The method of claim 8 further comprises:
receiving an input to delete the selected portion of the stream of multi-media data from the independent storage;
deleting the second linked list in response to the input; and
updating linking of the plurality of memory sections within the first linked list to include the set of memory sections.

11. An apparatus for storing multi-media data, the apparatus comprises:
a processing module; and
memory operably coupled to the processing module, wherein the memory includes a plurality of memory sections, and wherein the memory includes operational instructions that cause the processing module to:
maintain a first linked list of a plurality of memory sections, wherein the first linked list links the plurality of memory sections as a circular buffer,
receive a stream of multi-media data;
store the stream of multi-media data in at least some of the memory sections of the plurality of memory sections;
receive a request for independent storage of a selected portion of the stream of multimedia data;
generate a second linked list for a set of memory sections of the at least some of the memory sections, wherein the set of memory sections stores the selected portion of the stream of multi-media data; and
update linking of the plurality of memory sections within the first linked list without the set of memory sections.

12. The apparatus of claim 11, wherein the memory further comprises operational instructions that cause the processing module to:
generate a third linked list for a second set of memory sections of the at least some of the memory sections, wherein the second set of memory sections stores a second selected portion of the stream of multi-media data; and
update linking of the plurality of memory sections within the first linked list without the second set of memory sections.

13. The apparatus of claim 11, wherein the memory further comprises operational instructions that cause the processing module to:
receive an input to delete the selected portion of the stream of multi-media data from the independent storage;
delete the second linked list in response to the input; and
update linking of the plurality of memory sections within the first linked list to include the set of memory sections.

* * * * *